United States Patent
Chan et al.

(10) Patent No.: US 9,689,971 B2
(45) Date of Patent: Jun. 27, 2017

(54) LASER RANGING CALIBRATION METHOD AND APPARATUS USING THE SAME

(71) Applicant: MSI Computer (Shenzhen) Co., Ltd., Shenzhen, Guangdong Province (CN)

(72) Inventors: Hoa-Yu Chan, Taipei (TW); Shih-Che Hung, Hsinchu (TW)

(73) Assignee: MSI COMPUTER (SHENZHEN) CO., LTD., Shenzhen, Guangdong Province (CN)

( * ) Notice: Subject to any disclaimer, the term of this patent is extended or adjusted under 35 U.S.C. 154(b) by 0 days.

(21) Appl. No.: 15/018,691

(22) Filed: Feb. 8, 2016

(65) Prior Publication Data
US 2017/0102456 A1  Apr. 13, 2017

(30) Foreign Application Priority Data
Oct. 8, 2015  (TW) .............................. 104133202 A (51) Int. Cl.
*G01S 7/497* (2006.01)

(52) U.S. Cl.
CPC .................................. *G01S 7/497* (2013.01)

(58) Field of Classification Search
CPC ..................................................... G01B 11/14
See application file for complete search history.

(56) References Cited

U.S. PATENT DOCUMENTS

| 8,355,118 B2 | 1/2013 | Ogawa et al. |
| 2011/0310377 A1* | 12/2011 | Ohishi .................... G01S 7/497 356/5.01 |
| 2015/0288951 A1* | 10/2015 | Mallet ................. H04N 17/002 348/46 |

FOREIGN PATENT DOCUMENTS

| CN | 100523724 C | | 8/2009 | |
| CN | 201707034 U | * | 1/2011 | ............. C01B 11/14 |
| TW | I447355 B | | 8/2014 | |
| TW | 201439876 A | | 10/2014 | |
| TW | I457535 B | | 10/2014 | |
| TW | I485630 B | | 5/2015 | |

* cited by examiner

*Primary Examiner* — Luke Ratcliffe
(74) *Attorney, Agent, or Firm* — Muncy, Geissler, Olds & Lowe, P.C.

(57) ABSTRACT

The disclosure relates to a laser ranging calibration method and a laser range finder including a line laser generation module, an image capturing module and a processing module. The line laser generation module projects a line laser beam to a first direction from a first position. The image capturing module at a second position captures a ranging image in the first direction. When the ranging image includes a calibration target image of a calibration target having a first width, the processing module calculates a measured width of the calibration target according to a position of a line spot image of a laser spot on the calibration target image, obtains a calibration parameter according to the first width and the measured width, performs range finding according to the laser spot shown in the ranging image, and performs a calibration task using a calibration parameter.

17 Claims, 10 Drawing Sheets

LASER RANGING CALIBRATION METHOD AND APPARATUS USING THE SAME

CROSS-REFERENCE TO RELATED APPLICATIONS

This non-provisional application claims priority under 35 U.S.C. §119 (a) on Patent Application No (s). 104133202 filed in Taiwan, R.O.C. on Oct. 8, 2015, the entire contents of which are hereby incorporated by reference.

BACKGROUND

Technical Field

The disclosure relates to a laser ranging calibration method and an apparatus using the same, more particularly to a calibration method applied to a line laser ranging task, and to an apparatus using the same.

Related Art

Laser ranging is a high precision measurement method and can be applied to many fields. One of the laser ranging methods is using a line laser generating device and an image capturing device to measure a distance to an object under test according to the fixed relative position relationship between the two devices.

A line laser as a linear correlation distribution light source operates based on two variables. When the value of the variable X changes, the value of the variable Y also changes in response. The variable X indicates the width or thickness of the image of light of the light source on the object under test, the variable Y indicates the length or breadth (known as beam angle) of light of the light source passing through one or more lenses or a certain medium, and the variable Z indicates an energy distribution of light of the light source. X and Y have a property of linear distribution therebetween, X and Z have a property of linear distribution therebetween, and Y and Z have a property of linear distribution as well as a property of non-linear distribution therebetween. The property of non-linear distribution can become linear by engineering methods. One of the engineering methods includes adjusting one or more lenses and the pipe diameter of one or more copper tubes in the inner structure of the line laser. Therefore, all those light sources which fit in this correlation distribution are called liner lasers.

However, for a range finding device using a line laser, the relative positions of the line laser generating device and the image capturing device are actually unsteady because of some outer environment facts as time goes by. Although the relative positions only shift a bit, this shifting may cause great errors to the range finding result. Therefore, it is required to calibrate such shifting.

SUMMARY

Given the above problems, the disclosure provides a laser ranging calibration method and a laser range finder using the same to calibrate or compensate measurement errors caused by relative position errors.

According to one or more embodiment, the laser ranging calibration method includes the following steps. Project a line laser beam in a first direction to a calibration target from a first position by a line laser generation module to form a laser spot on a surface of the calibration target. The calibration target has a first width. Capture a ranging image in the first direction by an image capturing module at a second position. The ranging image includes a calibration target image of the calibration target and a line spot image of the laser spot. Calculate a measured width of the calibration target according to a position of the line spot image in the ranging image. Obtain a calibration parameter according to the first width and the measured width. Perform a ranging task by the line laser generation module and the image capturing module and perform a calibration task according to the calibration parameter.

According to one or more embodiments, the laser range finder for performing a calibration task by a calibration target having a first width includes a line laser generation module, an image capturing module and a processing module. The line laser generation module projects a line laser beam toward a first direction from a first position. The image capturing module captures a ranging image at a second position in the first direction. The processing module is electrically connected to line laser generation module and the image capturing module and performs a ranging task according to a laser spot of the line laser beam shown in the ranging image. When the ranging image includes a calibration target image of the calibration target, the processing module calculates a measured width of the calibration target according to a position of a line spot image of the laser spot in the calibration target image, obtains a calibration parameter according to a first width and the measured width, and uses the calibration parameter to perform the calibration task during the ranging task.

The calibration method and the laser range finder provided in the disclosure are used to measure a calibration target having a known size to determine range finding errors, and calculate a relative correction quantity. Therefore, this correction quantity will be used to calibrate the range finding errors during practical range finding task.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Given the problems in the art, the disclosure provides a laser range finder, more particularly an automatic apparatus that includes a line laser generation module and an image capturing module and is used to perform range finding tasks. Instances of the laser range finder include a household robotic vacuum cleaner, an industrial handling robot or another automatic apparatus having a range finding function.

Figure 1A:
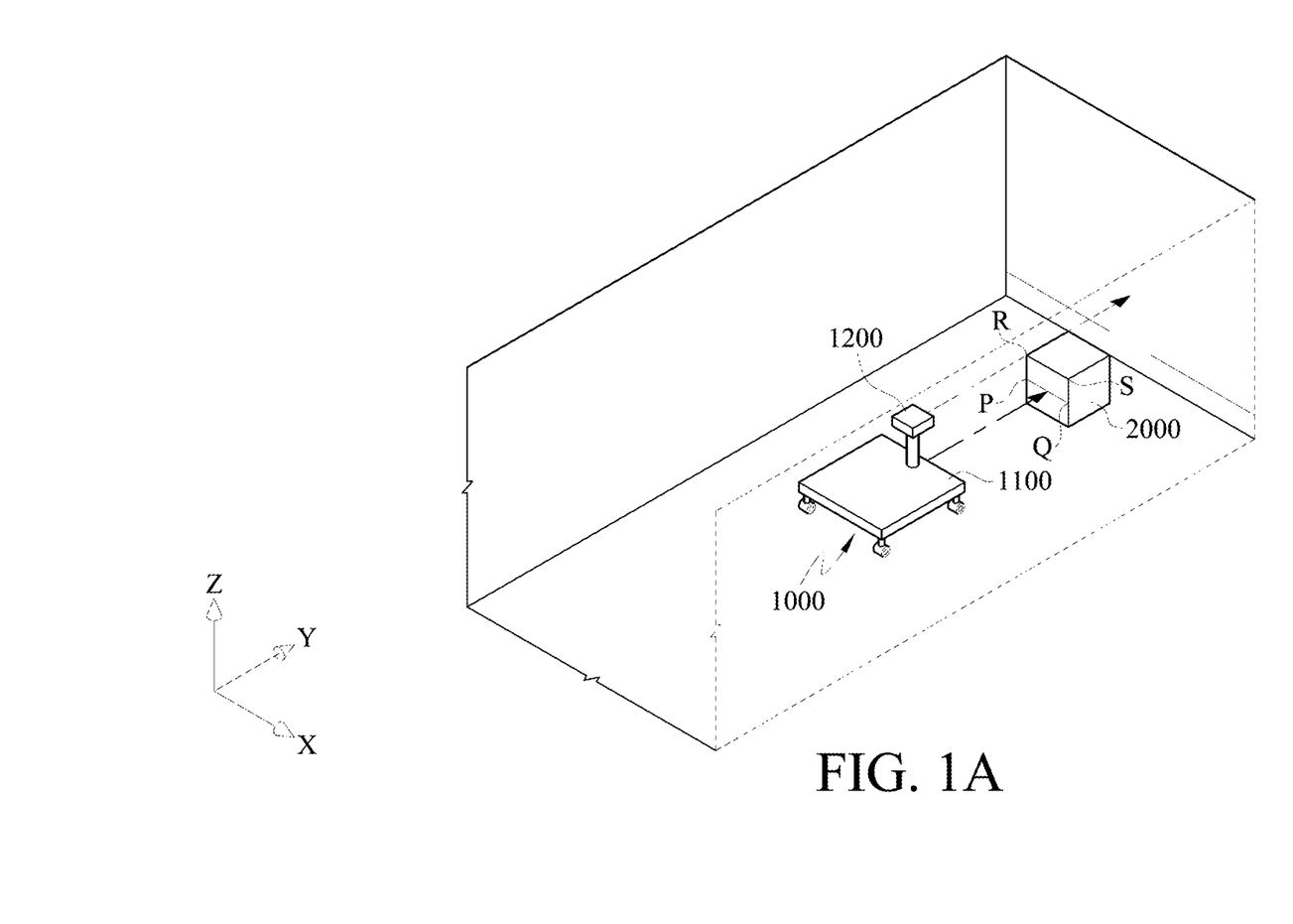
FIG. 1A is a schematic 3D view of a laser range finder in use in an embodiment.
Figure 1B:
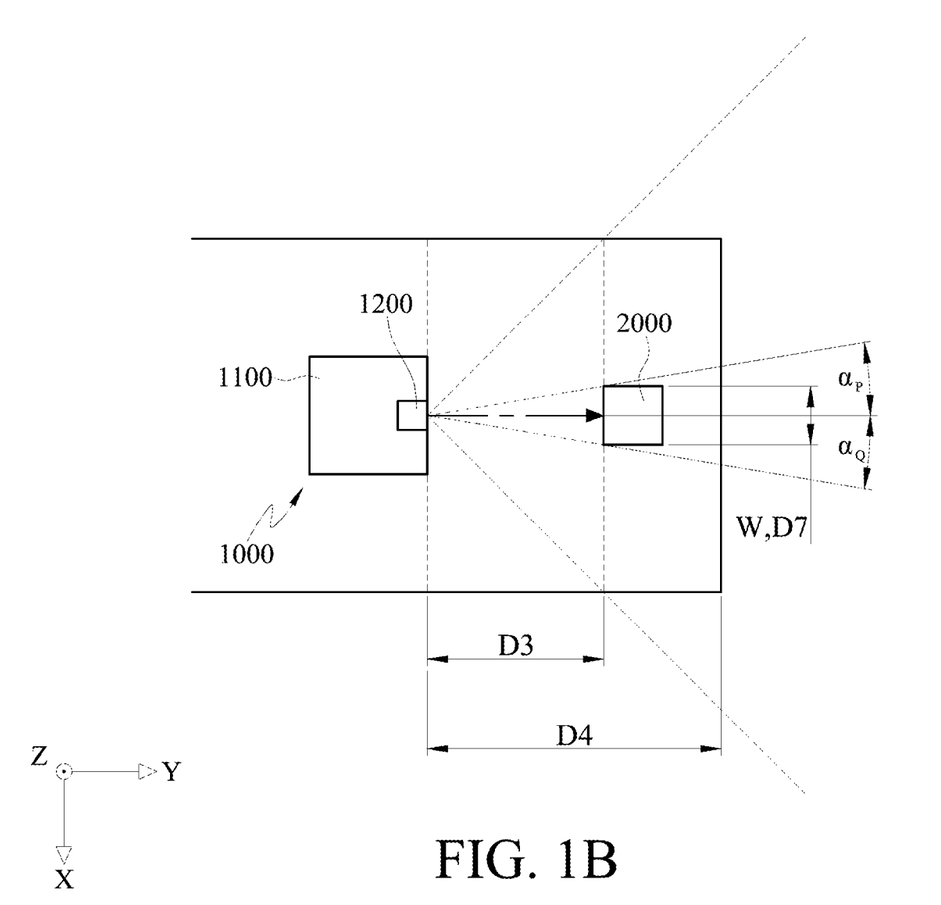
FIG. 1B is a schematic top view with respect to FIG. 1A.
Figure 1C:
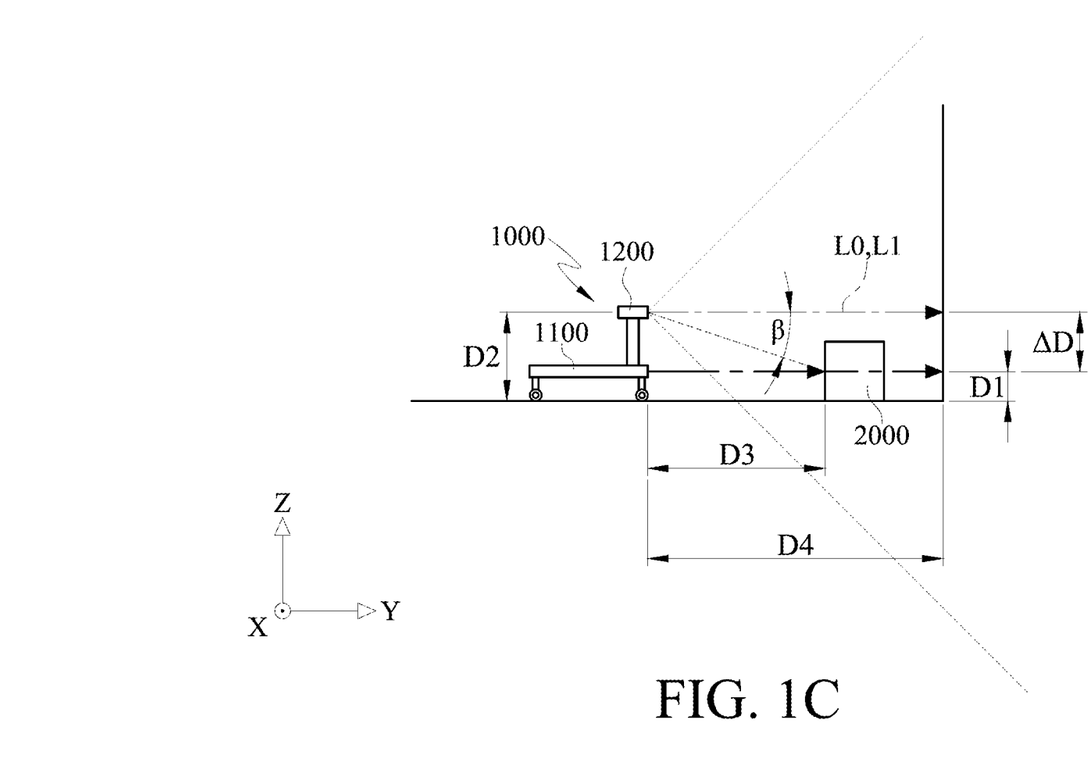
FIG. 1C is a schematic side view with respect to FIG. 1A.

Please refer to FIG. 1A to FIG. 1C. FIG. 1A is a schematic 3D view of a laser range finder in use in an embodiment, FIG. 1B is a schematic top view with respect to FIG. 1A, and FIG. 1C is a schematic side view with respect to FIG. 1A. A laser range finder 1000 includes a line laser generation module 1100 and an image capturing module 1200. In this embodiment, a XY plane at the Z-axis coordinate of 0 represents the ground. The line laser generation module 1100 is 5 centimeters (i.e. the distance D1) away from the ground, and its position is (0,0,5). The image capturing module 1200 is 15 centimeters (i.e. the distance D2) away from the ground, and its position is (0,0,15). The line laser generation module 1100 and the image capturing module 1200 both project laser beams or capture images along the Y-axis direction. The angle of view of the image capturing module 1200 is 90 degrees. A calibration target 2000 is on the ground and its Y-axis position is 30 centimeters (i.e. the distance D3) away from the plane where the image capturing module 1200 and the line laser generation module 1100 are located. The corridor where the calibration target 2000 is located has a width of 60 cm, and the wall at the end of the corridor has a distance of about 50 cm (i.e. the distance 4) with the image capturing module 1200. Although the orthogonal projection of the line laser generation module 1100 on the ground overlaps the orthogonal projection of the image capturing module 1200 on the ground in this embodiment, other embodiments may be contemplated. The foregoing and following embodiments related to the instances of distances and angles are only exemplified for the person skilled in the art to understand the spirit of the disclosure rather than limit the scope of the disclosure.

Figure 2:
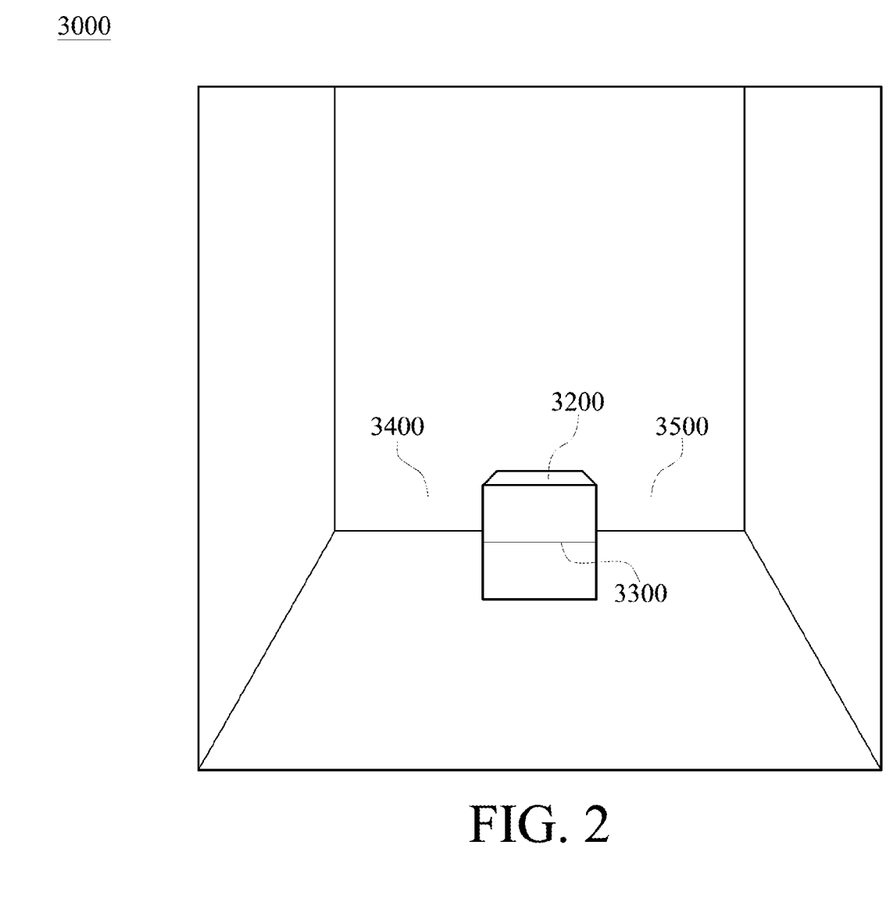
FIG. 2 is a schematic diagram of a ranging image with respect to FIG. 1A.

The line laser generation module 1100 generates line laser beams and projects the line laser beam toward the directly ahead of the laser range finder 1000, that is, toward the Y-axis direction in the drawing. The image capturing module 1200 captures images of the directly ahead of the laser range finder 1000. When the calibration target 2000 is in front of the laser range finder 1000, the image capturing module 1200 may capture ranging images, as shown in FIG. 2, which is a schematic diagram of a ranging image with respect to FIG. 1A. A ranging image 3000 includes a calibration target image 3200 of the calibration target 2000, an image of a laser spot 3300, an image of a laser spot 3400 and an image of a laser spot 3500. The laser spot 3300 is a spot formed by a laser beam projected on the surface of the calibration target 2000, and the laser spot 3400 and the laser spot 3500 are spots formed by laser beams projected on the wall in the end of the corridor.

Figure 3:
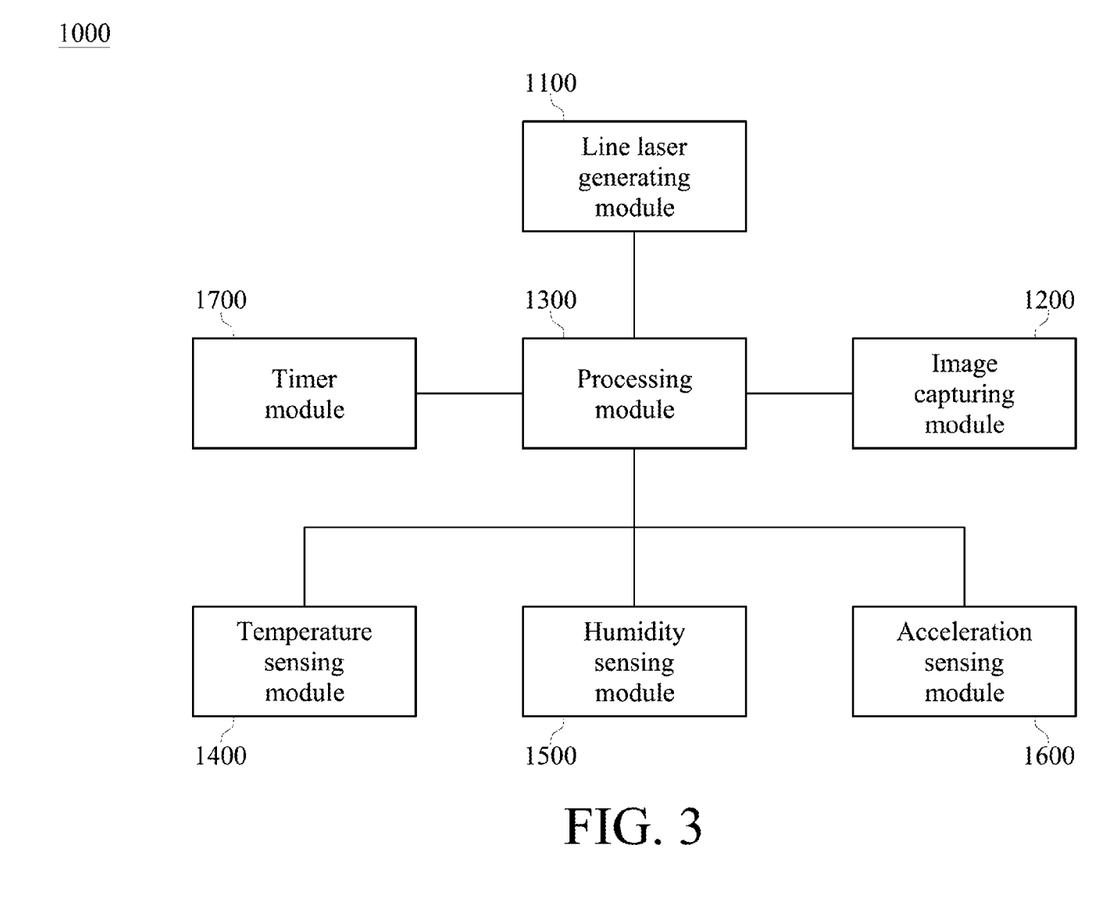
FIG. 3 is a functional block diagram of a laser range finder in an embodiment.

Please refer to FIG. 3. FIG. 3 is a functional block diagram of a laser range finder in an embodiment. In addition to the line laser generation module 1100 and the image capturing module 1200, the laser range finder 1000 also includes a processing module 1300. The processing module 1300 is electrically connected to the line laser generation module 1100 and the image capturing module 1200. The processing module 1300 estimates the distance 3 and the distance 4 according to the ranging image 3000.

Particularly, the coordinate (x,y) of each pixel in the ranging image 3000 substantially corresponds to a polar coordinate $(\alpha,\beta)$. For example, a 400*400 pixel image captured by the image capturing module 1200 having a 90-degree angle of view has an upper left vertex whose coordinate is (0,0), and a lower right vertex whose coordinate is (399,399). A pixel coordinate (x,y) in the image corresponds to a polar coordinate $(\alpha,\beta)$ which is expressed by the following equation:

$$(\alpha, \beta) = \left(\frac{x - 199.5}{199.5} \cdot 45°, \frac{199.5 - y}{199.5} \cdot 45°\right)$$

For example, if a pixel coordinate (x,y) is (70,80), this pixel corresponds to a polar coordinate $(-29.2°,27°)$, which is a relative angle between a direction line L0, which starts from the lens, and a segment between a point, corresponding to the pixel on an object, and the center of the lens in the image capturing module 1200.

Accordingly, in an instance with respect to FIG. 1B, FIG. 1C and FIG. 2, the processing module 1300 calculates the polar coordinate $(\alpha_P,\beta)$ of the point P (referred to as feature point) and the polar coordinate $(\alpha_Q,\beta)$ of the point Q (referred to as feature point) according to two terminals (the points P and Q) of the laser spot 3300 shown in the calibration target image 3200 in the ranging image 3000. Since the point P is the same height away from the ground as the point Q, the polar angle $\beta$ of the point P is the same as the polar angle $\beta$ of the point Q. The processing module 1300 calculates the distance 3 according to trigonometric functions, the distance difference $\Delta D$ between the distance 1 and the distance 2, and the polar angle $\beta$. According to the azimuth angle $\alpha_P$, the azimuth angle $\alpha_Q$ and the distance 3, the processing module 1300 calculates the width W of the calibration target 2000.

During the practical operation, the direction line L1 for the image capturing module 1200 to capture images may turn aside an original direction line L0, leading to errors occurring on the ranging task. For example, as described in FIG. 1A to FIG. 2, the direction line L0 is ideally parallel to the ground, the point P is located at the $281^{st}$ row, the $158^{th}$ column pixel, the point Q is located at the $281^{st}$ row, the $242^{nd}$ column pixel, the polar angle $\beta$ is $-18.38$ degrees, and the tangent value of the polar angle $\beta$ is 0.3323. In this case, the distance 3 is 30.09 cm, and the width W is 10.04 cm.

In practice, if the direction line L1 for the image capturing module 1200 to capture images is not parallel to the ground and shifts low (toward the ground) a bit, the position of an object shown in an image will shift up by a row of pixels. Therefore, the point P of the laser spot 3300 is located at the $280^{th}$ row, the $158^{th}$ column pixel, the point Q of the laser spot 3300 is located at the $280^{th}$ row, the $242^{nd}$ column pixel, the polar angle $\beta$ is $-18.16$ degrees, the tangent value of the polar angle $\beta$ is 0.3280, the distance 3 is 30.49 cm, and the width W is 10.17 cm.

If the direction line L1 for the image capturing module 1200 to capture images is not parallel to the ground and shifts up (away from the ground) a bit, the position of an object shown in an image will shift low by a row of pixels. Therefore, the point P of the laser spot 3300 is located at the $282^{nd}$ row, the $158^{th}$ column pixel, the point Q of the laser spot 3300 is located at the $282^{nd}$ row, the $242^{nd}$ column pixel, the polar angle $\beta$ is $-18.61$ degrees, the tangent value of the polar angle $\beta$ is 0.3367, the distance 3 is 29.70 cm, and the width W is 9.91 cm.

If the actual width of the calibration target 2000 is 10 cm, the processing module 1300 will know some errors occurring on the above values and also know how much the correction quantity should be. For instance, as described in the above embodiment, if the distance 3 is about 30 cm and the width W is about 10 cm, an equation of correcting pixel row number with respect to the width W can be expressed as follows:

$$\Delta p = \frac{(W - W_0)}{0.13}$$

Where $\Delta p$ is a row number correction quantity, $W_0$ is a known width of a calibration target (unit: cm), and W is a measured width of the calibration target obtained by the aforementioned method (unit: cm). In other words, if $W_0$ is 10 cm and W is 9.9 cm (i.e. the points P and Q are at the $282^{nd}$ row), the row number correction quantity is −0.8 and the row number is 281.2. Therefore, the polar angle β is −18.43 degrees, the tangent value is 0.3332, the distance 3 is 30.01 cm, and the width W becomes 10 cm. Moreover, the difference between the polar angle β and the calibrated polar angle β is Δβ, which is the offset of the current direction line L1 of the image capturing module 1200 as compared to the original direction line L0, and is a calibration parameter used to perform the ranging task by the laser range finder 1000.

Figure 4A:
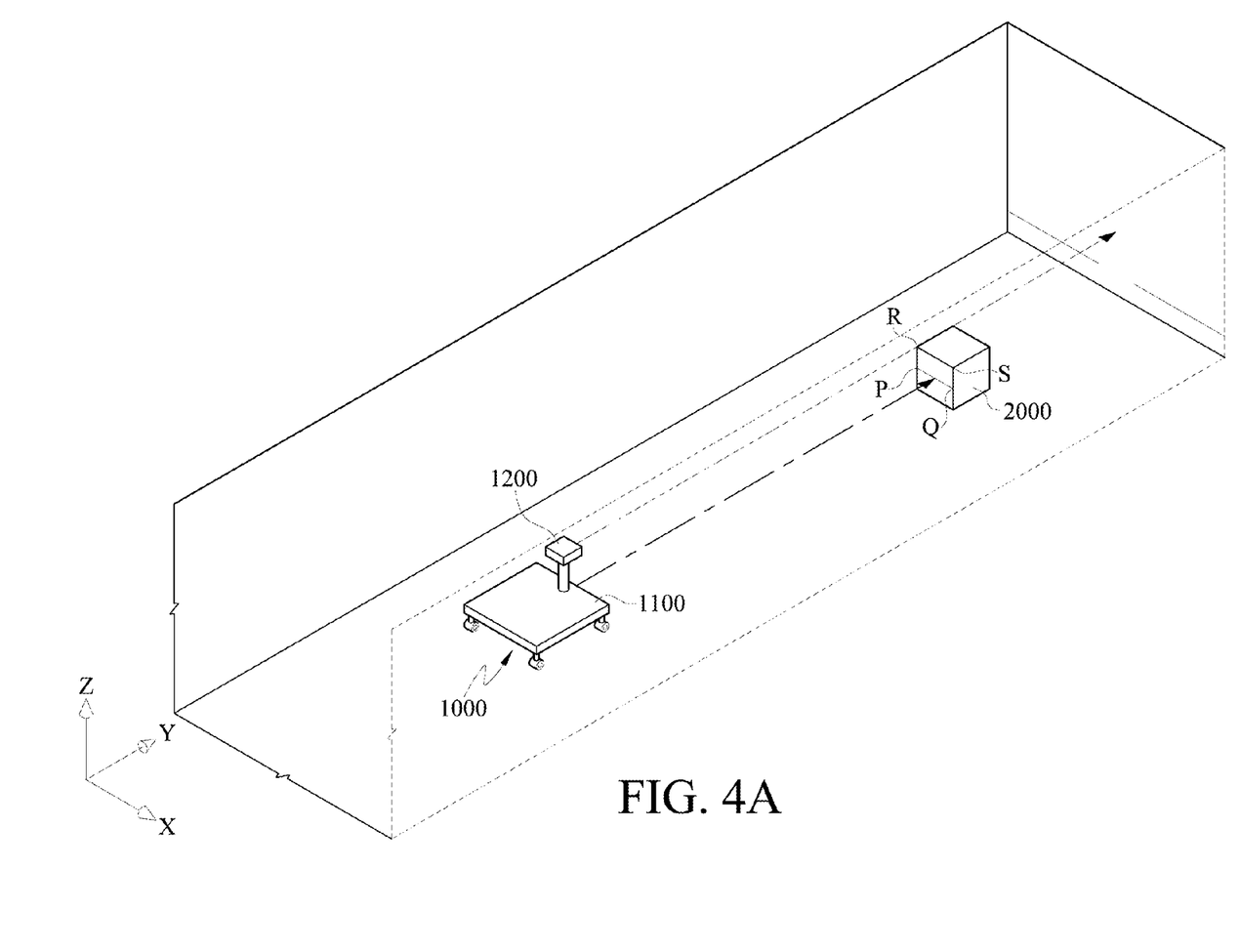
FIG. 4A is a schematic 3D view of a laser range finder in use in another embodiment.
Figure 4B:
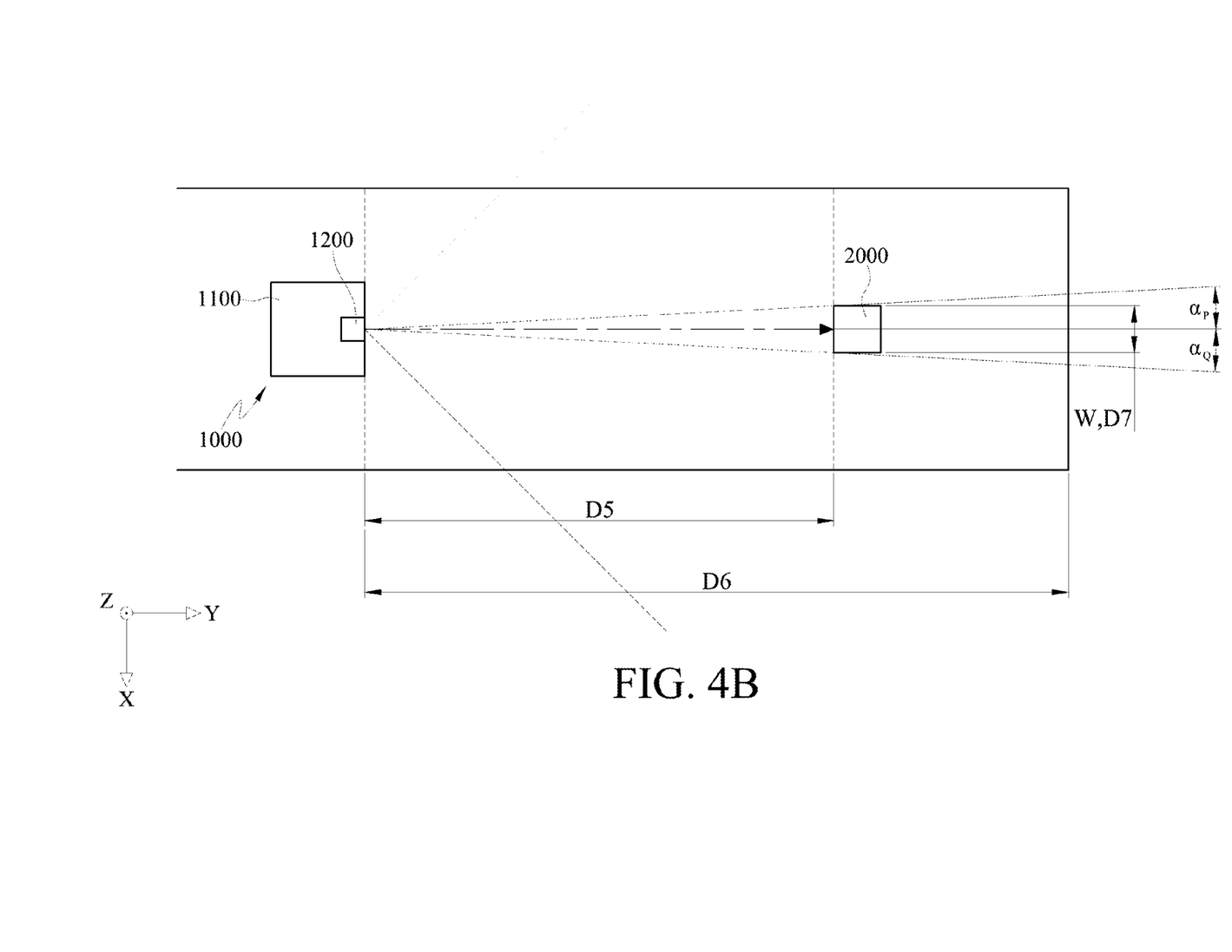
FIG. 4B is a schematic top view with respect to FIG. 4A.
Figure 4C:
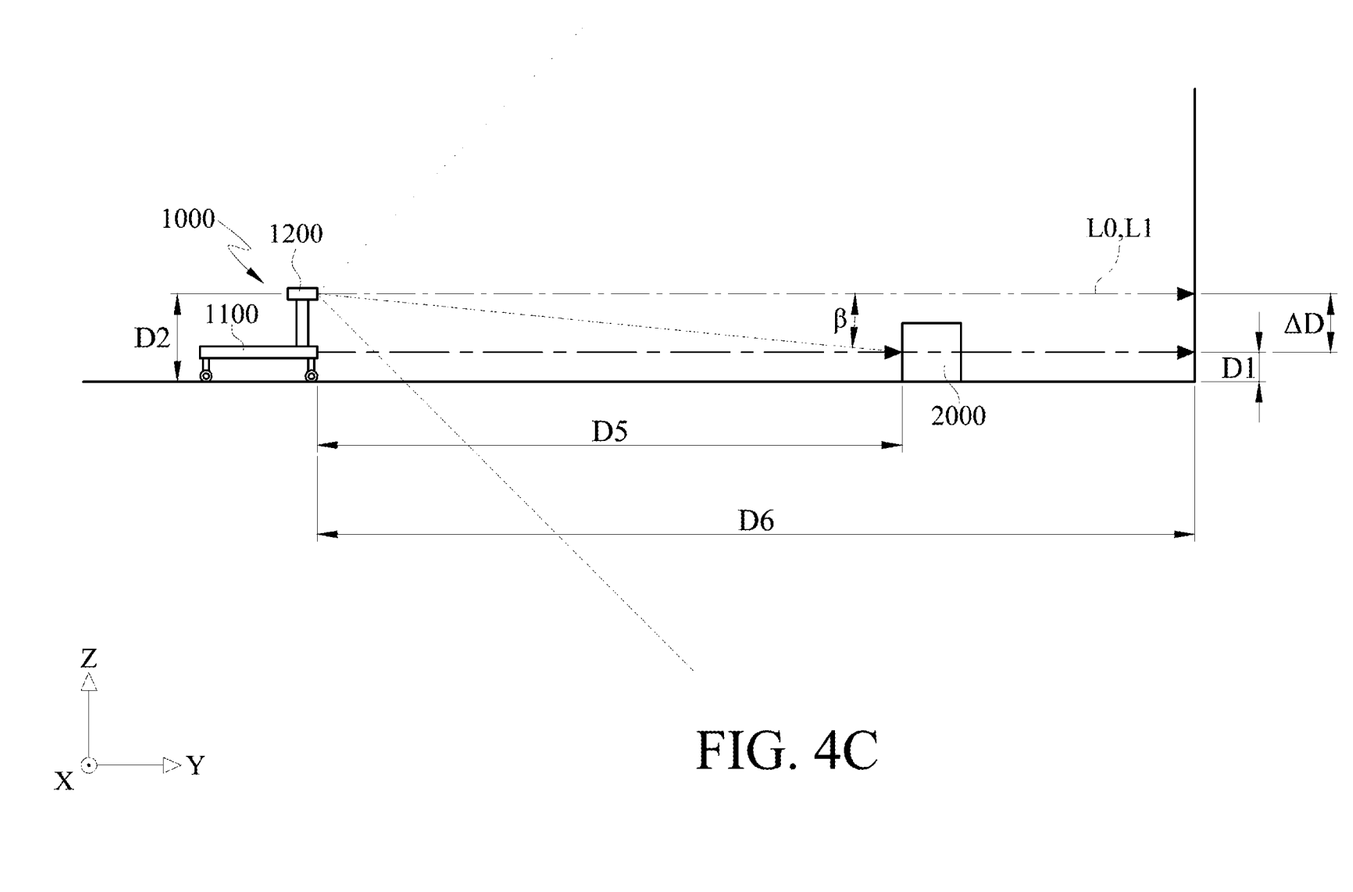
FIG. 4C is a schematic side view with respect to FIG. 4A.
Figure 5:
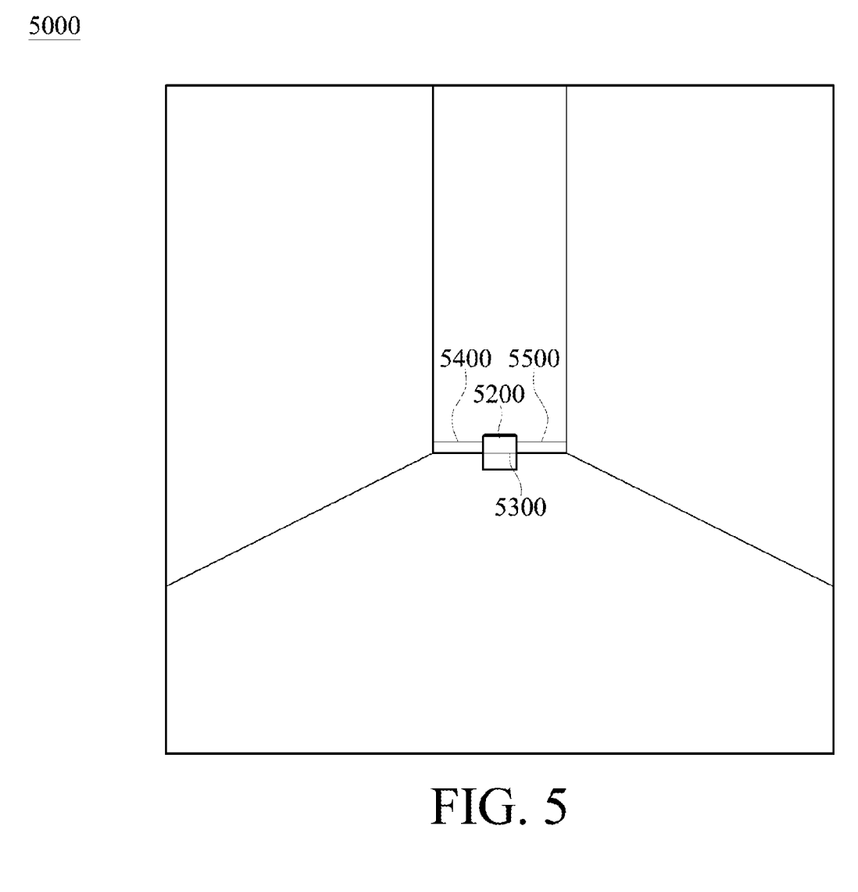
FIG. 5 is a schematic diagram of a ranging image with respect to FIG. 4A.

In another embodiment, the distance between the laser range finder 1000 and the calibration target 2000 becomes farther, as shown in FIG. 4A to FIG. 5. FIG. 4A is a schematic 3D view of a laser range finder in use in another embodiment, FIG. 4B is a schematic top view with respect to FIG. 4A, FIG. 4C is a schematic side view with respect to FIG. 4A, and FIG. 5 is a schematic diagram of a ranging image with respect to FIG. 4A. In this embodiment, the XY plane at the Z-axis coordinate of 0 represents the ground. The line laser generation module 1100 is 5 cm (i.e. the distance 1) away from the ground, and the position of the line laser generation module 1100 is (0,0,5). The image capturing module 1200 is 15 cm (i.e. the distance 2) away from the ground, and the position of the image capturing module 1200 is (0,0,15). The line laser generation module 1100 and the image capturing module 1200 both project laser beams or capture images along the Y-axis direction. The angle of view of the image capturing module 1200 is 90 degrees. The calibration target 2000 is disposed on the ground, and its Y-axis position is about 1 meter (i.e. the distance 5) away from the plane where the image capturing module 1200 and the line laser generation module 1100 are located. The corridor where the calibration target 2000 is has a 60 cm width, and the wall in back of the corridor has an about 1.5 m (i.e. the distance 6) with the image capturing module 1200.

As shown in FIG. 5, a ranging image 5000 includes a calibration target image 5200 of the calibration target 2000, an image of a laser spot 5300, an image of a laser spot 5400, and an image of a laser spot 5500. The laser spot 5300 is formed by a laser beam projected on the surface of the calibration target 2000, and the laser spots 5400 and 5500 are formed by laser beams projected on the wall in back of the corridor.

Since the direction line L0 is ideally parallel to the ground, the point P' of the laser spot 5300 is at the $225^{th}$ row, the $187^{th}$ column pixel, the point Q' of the laser spot 5300 is at the $225^{th}$ row, the $213^{th}$ column pixel, the polar angle β is −5.75 degrees, the tangent value of the polar angle β is 0.1007, the distance 5 is 99.27 cm, and the width W is 10.17 cm.

If the direction line L1 for the image capturing module 1200 to capture images is not parallel to the ground in practice and shifts low (toward the ground) a bit, the position of an object shown in an image will shift up by 1 row of pixels. The point P' of the laser spot 5300 is at the $224^{th}$ row, the $187^{th}$ column pixel, and the point Q' of the laser spot 5300 is at the $224^{th}$ row, the 213 column pixel, the polar angle β is −5.53 degrees, the tangent value of the polar angle β is 0.0968, the distance 5 is 103.36 cm, and the width W is 10.59 cm.

If the direction line L1 for the image capturing module 1200 to capture images is not parallel to the ground in practice and shifts up (away from the ground) a bit, the position of an object shown in an image will shift low by a row of pixels. The point P' of the laser spot 5300 is at the $226^{th}$ row, $187^{th}$ column pixel, the point Q' of the laser spot 5300 is at the $226^{th}$ row, $213^{th}$ column pixel, the polar angle β is −5.98 degrees, the tangent value of the polar angle β is 0.1047, the distance 5 is 95.5 cm, and the width W is 9.78 cm.

If the actual width of the calibration target 2000 is 10 cm, the processing module 1300 will know that errors occur on the above calculation result, and know how much the correction quantity should be. For example, as described above, if the distance 5 is about 100 cm and the width W is about 10 cm, an equation related to the width W and a correction pixel row number is expressed as follows:

$$\Delta p = \frac{(W - W_0)}{0.4},$$

wherein $\Delta p$ represents a row number correction quantity; $W_0$ represents a width of a calibration target, whose unit is cm; and W represents a measured width of a calibration target, whose unit is cm and which is obtained by the aforementioned method. For example, if $W_0$ is 10 cm and W is 9.78 cm (i.e. the points P' and Q' are at the $226^{th}$ row), a row number correction quantity calculated using the above equation is −0.55, that is, the number of rows is 225.45. Then, the polar angle β is −5.85 degrees, the tangent value is 0.1025, the distance 3 is 97.54 cm, and the width W is 9.99 cm. For the person skilled in the art, other embodiments may be contemplated in which the processing module 1300 stores in advance a lookup table, in which the processing module 1300 can directly search for a correction quantity according to the measured distance (e.g. D3 or D5) of the calibration target 2000 and the measured width W of the calibration target 2000.

The foregoing embodiments illustrate the offset occurring to the direction line L1 that the image capturing module 1200 captures images. Other embodiments may be contemplated in which the distance difference ΔD is changed and is not 10 cm. In practice, as described in FIG. 2, the points R and S (referred to as feature points) are two reference points outside the calibration target 2000. In the drawing, the distance 7 between the points R and S should be equal to the width W. However, the distance 7 presented in the image is slightly longer than the measured width W. It indicates that the direction line L1 has a depression angle. In other words, images for range finding need to be shifted low. If the distance 7 is slightly shorter than the measured width W, it indicates that the direction line L1 has an elevation angle. In other words, images for range finding need to be shifted up. If the distance 7 is equal to the measured width W, since the distance 7 is different from the known width W0 of the calibration target 2000, it will be considered that the distance difference ΔD changes. Particularly, if the column number difference between the points P and Q in an image is equal to the column number difference between the points R and S in the image, it means that the distance 7 is equal to the measured width W. If the column number difference between the points P and Q in an image is more than the column number difference between the points R and S in the image, it means that the distance 7 is longer than the measured width W.

Accordingly, in an embodiment, the processing module 1300, according to the distance 7, the measured width W and the known width $W_0$ of the calibration target, determines that the error source is the offset of the direction line L1 or the change in the distance difference ΔD. Then, the processing module 1300 adjusts the calibration parameter (e.g. as described with respect to FIG. 1A to FIG. 1C) according to the equation of the width W expressed as follows:

$$W = D3 \cdot (\tan \alpha_P + \tan \alpha_Q) = \Delta D \cdot \cot \beta \cdot (\tan \alpha_P + \tan \alpha_Q),$$

wherein $\alpha_P$ and $\alpha_Q$ are two polar angles related to the points P and Q and the direction line L1 in the angle of view in FIG. 1B respectively, and errors are ignored in the simplified calculation.

However, because of the upper limitation in the resolution of the ranging image 3000 captured by the image capturing module 1200, an area on a physical object, which corresponds to each pixel of the image of an object that is too far, is too large. For instance, as described with respect to FIG. 2 and FIG. 5, when the distance 3 between the calibration target 2000 and the line laser generation module 1100 is 30 cm, a pixel corresponds to an area of 0.12 cm×0.12 cm on the calibration target 2000. When the distance 5 between the calibration target 2000 and the line laser generation module 1100 is 100 cm, a pixel corresponds to an area of about 0.4 cm×0.4 cm on the calibration target 2000. Therefore, when the calibration target 2000 is too far from the line laser generation module 1100, in view of the above two examples, greater errors may occur to the calibration method in the disclosure.

On the other hand, when the calibration target 2000 is too close to the line laser generation module 1100, aberration may occur at the area close to the edge of the lens of the image capturing module 1200, leading to image distortion. Therefore, the measurement result and the calibration effect may not be good. Moreover, as described above with respect to FIG. 1B and FIG. 4B, the relatively short distance (e.g. D3 or D6) requires the relatively larger angle between the direction line L1 and the direction line L0, whereby the processing module 1300 possibly senses the change of one pixel. Therefore, it needs to decide a suitable calibrated distance (i.e. the distance 3 or the distance 5) so as to obtain a sufficiently good calibration parameter.

Figure 6:
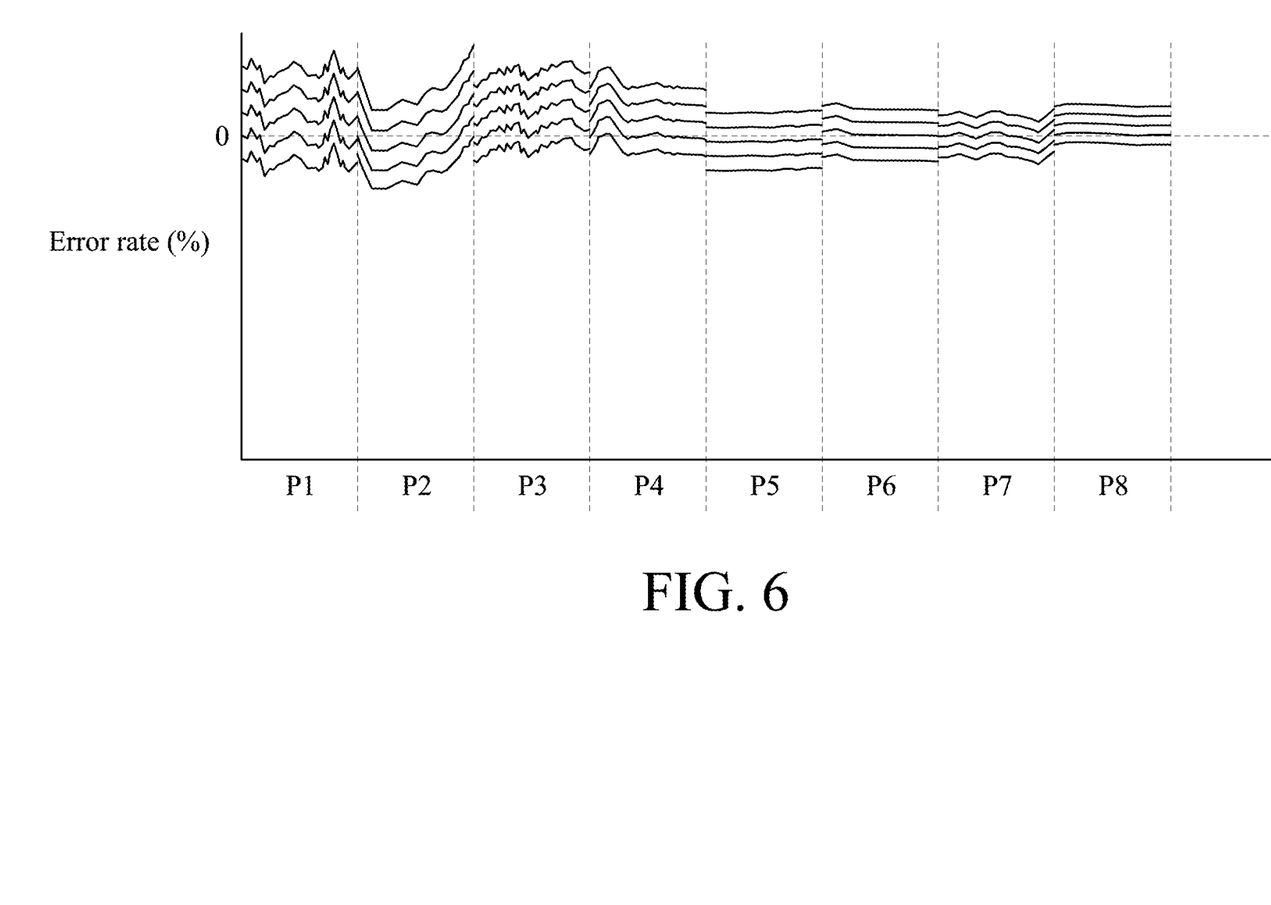
FIG. 6 is a schematic diagram of results obtained when the laser range finder performs range finding many times in an embodiment.

In an embodiment, the method of deciding a calibrated distance is illustrated with respect to FIG. 6, which is a schematic diagram of results obtained when the laser range finder performs the range finding procedure many times in an embodiment. The horizontal axis represents time, and the vertical axis represents error values. The curves in the drawing are illustrated from up to down as follows. The first curve represents the pixel row number minus 1 (i.e. the entire image shifts up by one row of pixels), the second curve represents the pixel row number minus 0.5 (i.e. the entire image shifts up by 0.5 row of pixels), the third curve represents the pixel row number under no calibration, the fourth curve represents the pixel row number plus 0.5 (i.e. the entire image shifts low by 0.5 row of pixels), and the fifth curve represents the pixel row number minus 1 (i.e. the entire image shifts up by one row of pixels). During the first time period P1, the laser range finder 1000 has an interval of 2 m (referred to as a candidate distance) with the calibration target 2000 for measurement; during the second time period P2, the laser range finder 1000 has an interval of 1.8 m (referred to as a candidate distance) with the calibration target 2000 for measurement; during the third time period P3, the laser range finder 1000 has an interval of 1.6 m (referred to as a candidate distance) with the calibration target 2000 for measurement; during the fourth time period P4, the laser range finder 1000 has an interval of 1.4 m (referred to as a candidate distance) with the calibration target 2000 for measurement; during the fifth time period P5, the laser range finder 1000 has an interval of 1.2 m (referred to as a candidate distance) with the calibration target 2000 for measurement; during the sixth time period P6, the laser range finder 1000 has an interval of 1 m (referred to as a candidate distance) with the calibration target 2000 for measurement; during the seventh time period P7, the laser range finder 1000 has an interval of 0.8 m (referred to as a candidate distance) with the calibration target 2000 for measurement; and during the eighth time period P8, the laser range finder 1000 has an interval of 0.6 m (referred to as a candidate distance) with the calibration target 2000 for measurement. In this case, the width W of the calibration target 2000 is 56 cm. During every time period, the laser range finder 1000 measures the calibration target 2000 many times to obtain measured distances (D3) and stores them in a non-volatile memory in the processing module 1300.

As described in the drawing, the measurement results obtained against the width of the calibration target during each of the first time period P1 to the fourth time period P4 are insufficiently normalized, so the measured distances obtained during these time periods are not suitable for calibration tasks; and the measurement results obtained against the width of the calibration target during each of the fifth time period P5 to the eighth time period P8 are relatively normalized, so the measured distances obtained during these time periods are suitable for calibration tasks. In other words, the above experimental image capturing module and calibration target are suitably applied to the calibration tasks in the distance of 1.2 m to 0.6 m.

In other words, the processing module 1300 controls the laser range finder 1000 to perform range finding to the calibration target 2000 by N pieces of positions and simultaneously detect the distance with the calibration target 2000 (distance measurement) and the width of the calibration target 2000. The laser range finder 1000 performs M times of measurements at each of the N pieces of positions to obtain M pieces of measured widths of the calibration target 2000 and records them. The processing module 1300 collects the maximum of the M pieces of measured widths of the calibration target 2000 related to each of the positions in order to obtain the measurement deltas and measured distances related to the first position to the Nth position. The measurement delta Di related to the ith position is expressed as follows:

$$Di = \max(Wi) - \min(Wi),$$

wherein max (Wi) represents a maximum of widths obtained in M times of measurements at the ith position, and min (Wi) represents a minimum of widths obtained in M times of measurements at the ith position. N and M are positive integers larger than 1, and i is a positive integer smaller than or equal to N.

The processing module 1300 selects one or more positions which are related to the measurement delta Di smaller than a delta threshold, and a measured distance corresponding to the selected position is defined as a relatively ideal distance for calibration. In another embodiment, the processing module 1300 arranges the N pieces of measurement deltas and then selects the one or more positions related to the one or more relatively small measurement deltas to be one or more calibrated distances.

When a laser range finder uses the one or more aforementioned embodiments of the method, it may not perform a calibration task at any time in order to give consideration to both efficiency and accuracy. Therefore, the laser range finder will perform a calibration task only at right time (i.e. if required). Also, the fastening mechanism between the image capturing module and the line laser generation module in the laser range finder, as described above, may slightly be deformed by collisions or the changes in temperature or humidity. Therefore, in an embodiment with respect to FIG. 3, the laser range finder 1000 further includes a temperature sensing module 1400 electrically connected to the processing module 1300. During every calibration task, the temperature sensing module 1400 senses the current temperature, i.e. a calibration temperature, during a calibration task and stores it in a non-volatile memory in the processing module 1300. When the laser range finder 1000 is operating, the temperature sensing module 1400 regularly or irregularly senses the current temperature and the processing module 1300 compares the sensed current temperature with the calibration temperature. When the difference between the sensed current temperature and the calibration temperature is greater than a temperature difference threshold, the processing module 1300 will note that the laser range finder 1000 needs to be calibrated, and automatically performs a calibration task when the laser range finder is idle.

In another embodiment, as shown in FIG. 3, the laser range finder 1000 further includes a humidity sensing module 1500 electrically connected to the processing module 1300. Whenever a calibration task is performed, the humidity sensing module 1500 will sense the current humidity, i.e. a calibration humidity, during the calibration task and store the calibration humidity in a non-volatile memory in the processing module 1300. After that, when the laser range finder 1000 is operating, the humidity sensing module 1500 regularly or irregularly senses current humidity and the processing module 1300 compares the current humidity with the calibration humidity. When the difference between the current humidity and the calibration humidity is larger than a humidity difference threshold, the processing module 1300 will note that the laser range finder 1000 needs to be calibrated. The processing module 1300 automatically performs a calibration task when the laser range finder 1000 is idle. Furthermore, the processing module 1300 decides whether the laser range finder 1000 needs to be calibrated, according to all the current temperature and humidity and the calibration temperature and humidity.

In another embodiment, as shown in FIG. 3, the laser range finder 1000 further includes an acceleration sensing module 1600 electrically connected to the processing module 1300. Whenever a calibration task is finished, the processing module 1300 zeros a quantity of collisions. During the operation of the laser range finder 1000, whenever the laser range finder 1000 is collided, the acceleration sensing module 1600 generates a collision indication signal. The processing module 1300 acculates the quantity of collisions according to the collision indication signal. When the quantity of collisions is larger than a collision number threshold, the processing module 1300 will note that the laser range finder 1000 needs to be calibrated. The processing module 1300 automatically performs a calibration task whenever the laser range finder 1000 is idle. Also, if the laser range finder 1000 is collided by a relatively large force, the processing module 1300, according to the collision indication signal, determines whether the instantaneous acceleration is larger than a collision force threshold. When the instantaneous acceleration is larger than a collision force threshold, the processing module 1300 automatically performs a calibration task in real time. Moreover, the acceleration sensing module 1600 is, for example, a three-axis accelerometer or a gyroscope, and the acceleration sensing module 1600 generally checks whether the direction of the line laser beam emitted by the line laser generation module 1100 is horizontal, in order to avoid the occurrence of errors.

In addition, even if the laser range finder 1000 has not been subjected to the great changes in temperature and/or humidity or to any violent collision, as time goes by other environment facts will still cause the distortion of the fastening mechanism in the laser range finder 1000. For example, as time goes by the metal or other rigid materials used in the fastening mechanism may get old, resulting in the slight shape distortion. In an embodiment, as shown in FIG. 3, the laser range finder 1000 further includes a timer module 1700. Whenever a calibration task is finished, the processing module 1300 will acquire a calibrating time from the timer module 1700. The timer module 1700 sends a signal specifying the current time to the processing module 1300 at any time. The processing module 1300 then determines whether the difference between the current time and the calibrating time is greater than a time threshold. When the difference is greater than the time threshold, the processing module 1300 will consider that the laser range finder 1000 needs to be calibrated, and will perform a calibration task for it at a suitable time.

What is claimed is:
1. A laser ranging calibration method comprising steps of:
    (a) projecting a line laser beam in a first direction to a calibration target by a line laser generation module at a first position to form a laser spot on a surface of the calibration target, the calibration target having a first width;
    (b) capturing a ranging image in the first direction by an image capturing module at a second position, the ranging image comprising a calibration target image of the calibration target and a line spot image of the laser spot, the first position having a constant correlation with the second position;
    (c) calculating a measured width of the calibration target according to a position of the line spot image in the ranging image;
    (d) obtaining a calibration parameter according to the first width and the measured width; and
    (e) performing a ranging task by the line laser generation module and the image capturing module and performing a calibration task according to the calibration parameter;
    wherein the step (c) comprises:
        calculating a plurality of angles of two terminals of the line spot image in respect to a lens of the image capturing module according to an angle of view of the image capturing module, an amount of pixels of the ranging image and pixels of the line spot image; and calculating the measured width according to correlation among the angles, the first position and the second position.

2. The laser ranging calibration method according to claim 1, further comprising before the step (a) is performed:
selectively performing the step (a) according to a current time, a calibrating time and a time threshold.

3. The laser ranging calibration method according to claim 1, further comprising before the step (a) is performed:
selectively performing the step (a) according to a current temperature, a calibration temperature and a temperature difference threshold.

4. The laser ranging calibration method according to claim 1, further comprising before the step (a) is performed:
selectively performing the step (a) according to a current humidity, a calibration humidity and a humidity difference threshold.

5. The laser ranging calibration method according to claim 1, further comprising before the step (a) is performed:
selectively performing the step (a) according to a quantity of collisions and a collision number threshold.

6. The laser ranging calibration method according to claim 1, wherein the calibration target further comprises a first feature point and a second feature point, and the laser ranging calibration method further comprises step of:
(f) calculating a characteristic distance between the first feature point and the second feature point according to a position of an image of the first feature point and a position of an image of the second feature point in the ranging image; and
in the step (d), the calibration parameter is obtained according to the characteristic distance.

7. A laser range finder for performing a calibration task by a calibration target having a first width, and the laser range finder comprising:
a line laser generation module configured to project a line laser beam toward a first direction from a first position;
an image capturing module configured to capture a ranging image at a second position in the first direction; and
a processing module electrically connected to the line laser generation module and the image capturing module and configured to perform a ranging task according to a laser spot corresponding to the line laser beam in the ranging image, acquire a calibration parameter according to a position of a line spot image of the laser spot on a calibration target image when the ranging image comprises the calibration target image of the calibration target, and calibrate the calibration parameter during the ranging task;
wherein the processing module records a correlation among an angle of view of the image capturing module, a number of pixels of the ranging image, the first position and the second position, and the processing module calculates a plurality of angles of two terminals of the line spot image in respect to lens in the image capturing module according to the angle of view and the number of pixels of the line spot image and calculates a measured width according to the angles and the correlation.

8. The laser range finder according to claim 7, wherein when acquiring the calibration parameter, the processing module calculates a measured width of the calibration target according to the position of the line spot image and acquires the calibration parameter according to the first width and the measured width.

9. The laser range finder according to claim 7, further comprising:
a timer module electrically connected to the processing module and configured to detect a calibrating time for each calibration and detect a current time during the operation of the laser range finder,
wherein the processing module selectively performs the calibration using the calibration target according to the current time, the calibrating time and a time threshold.

10. The laser range finder according to claim 7, further comprising:
a temperature sensing module electrically connected to the processing module and configured to sense a recorded temperature for each calibration and sense a current temperature during the operation of the laser range finder,
wherein the processing module selectively performs the calibration using the calibration target according to the current temperature, the recorded temperature and a temperature difference threshold.

11. The laser range finder according to claim 7, further comprising:
a humidity sensing module electrically connected to the processing module and configured to sense a recorded humidity for each calibration and sense a current humidity during the operation of the laser range finder,
wherein the processing module selectively performs the calibration using the calibration target according to the current humidity, the recorded humidity and a humidity difference threshold.

12. The laser range finder according to claim 7, further comprising:
an acceleration sensing module electrically connected to the processing module and configured to sense a collision to generate a collision indication signal corresponding to the collision,
wherein the processing module accumulates a quantity of collisions according to the collision indication signal, selectively performs the calibration task using the calibration target according to the quantity of collisions and a collision number threshold, and resets the quantity of collisions after the calibration task is finished.

13. The laser range finder according to claim 7, wherein the calibration target further comprises a first feature point and a second feature point, and the processing module further calculates a characteristic distance between the first feature point and the second feature point according to a position of an image of the first feature point and a position of an image of the second feature point in the ranging image and obtains the calibration parameter according to the characteristic distance.

14. A laser ranging calibration method comprising steps of:
(a) projecting a line laser beam in a first direction to a calibration target by a line laser generation module at a first position to form a laser spot on a surface of the calibration target, the calibration target having a first width;
(b) capturing a ranging image in the first direction by an image capturing module at a second position, the ranging image comprising a calibration target image of the calibration target and a line spot image of the laser spot, the first position having a constant correlation with the second position;

(c) calculating a measured width of the calibration target according to a position of the line spot image in the ranging image;
(d) obtaining a calibration parameter according to the first width and the measured width; and
(e) performing a ranging task by the line laser generation module and the image capturing module and performing a calibration task according to the calibration parameter,
wherein before the step (a) to the step (e) are performed, the laser ranging calibration method further comprises:
adjusting a distance between the first position and the calibration target to repeat the step (a) to the step (c) based on each of N different candidate distances for M times;
setting a difference between the maximum and minimum of M measured widths, which are obtained by repeating the steps (a) to (c) based on the ith candidate distance for M times, to be an ith measurement delta corresponding to the ith candidate distance;
selecting at least one candidate distance of the N candidate distances to be a calibrated distance according to the N measurement deltas and a delta threshold; and
adjusting the distance between the first position and the calibration target in the calibrated distance when the step (a) to the step (e) are being performed,
wherein N and M are integers larger than 1.

15. A laser ranging calibration method comprising steps of:
(a) projecting a line laser beam in a first direction to a calibration target by a line laser generation module at a first position to form a laser spot on a surface of the calibration target, the calibration target having a first width;
(b) capturing a ranging image in the first direction by an image capturing module at a second position, the ranging image comprising a calibration target image of the calibration target and a line spot image of the laser spot, the first position having a constant correlation with the second position;
(c) calculating a measured width of the calibration target according to a position of the line spot image in the ranging image;
(d) obtaining a calibration parameter according to the first width and the measured width; and
(e) performing a ranging task by the line laser generation module and the image capturing module and performing a calibration task according to the calibration parameter;
wherein before the step (a) to the step (e) are performed, the laser ranging calibration method further comprises:
adjusting a distance between the first position and the calibration target to repeat the step (a) to the step (c) based on N different candidate distances M times;
setting a difference between the maximum and minimum of M measured widths to be an ith measurement delta corresponding to the ith candidate distance of the N candidate distances, wherein the M measured widths are obtained by repeating the step (a) to the step (c) based on the ith candidate distance M times;
selecting k relatively small measurement deltas among the N measurement deltas and setting one of k candidate distances corresponding to the selected k relatively small measurement deltas among the N candidate distances to be a calibrated distance; and
adjusting a distance between the first position and the calibration target according to the calibrated distance when the step (a) to the step (e) are being performed,
wherein N and M are integers larger than 1, k is a positive integer smaller than N.

16. A laser range finder for performing a calibration task by a calibration target having a first width, and the laser range finder comprising:
a line laser generation module configured to project a line laser beam toward a first direction from a first position;
an image capturing module configured to capture a ranging image at a second position in the first direction; and
a processing module electrically connected to the line laser generation module and the image capturing module and configured to perform a ranging task according to a laser spot corresponding to the line laser beam in the ranging image, acquire a calibration parameter according to a position of a line spot image of the laser spot on a calibration target image when the ranging image comprises the calibration target image of the calibration target, and calibrate the calibration parameter during the ranging task,
wherein the processing module further adjusts a distance between the first position and the calibration target to repeatedly measure a measured width of the calibration target for M times based on each of N different candidate distances;
based on the ith candidate distance of the N candidate distances, the processing module sets a difference between the maximum and minimum of the M measured widths to be an ith measurement delta corresponding to the ith candidate distance; and
the processing module selects and sets at least one of the N candidate distances to be a calibrated distance according to the N measurement deltas and a delta threshold, and uses the calibrated distance to adjust the distance between the first position and the calibration target in order to obtain the calibration parameter, and N and M are integers larger than 1.

17. A laser range finder for performing a calibration task by a calibration target having a first width, and the laser range finder comprising:
a line laser generation module configured to project a line laser beam toward a first direction from a first position;
an image capturing module configured to capture a ranging image at a second position in the first direction; and
a processing module electrically connected to the line laser generation module and the image capturing module and configured to perform a ranging task according to a laser spot corresponding to the line laser beam in the ranging image, acquire a calibration parameter according to a position of a line spot image of the laser spot on a calibration target image when the ranging image comprises the calibration target image of the calibration target, and calibrate the calibration parameter during the ranging task,
wherein the processing module further adjusts a distance between the first position and the calibration target to repeatedly measure the measured width of the calibration target M times based on each of N different candidate distances;
based on the ith candidate distance of the N candidate distances, the processing module records a difference between the maximum and minimum of the M measured widths to be an ith measurement delta corresponding to the ith candidate distance; and the processing module selects k relatively small measurement deltas among the N measurement deltas and sets one of k candidate distances corresponding to the selected k measurement deltas among the N candidate distances to be a calibrated distance; and the processing module uses the calibrated distance to adjust the distance between the first position and the calibration target in order to obtain the calibration parameter, and N and M are integers larger than 1.

* * * * *